3,766,113
GRAFT POLYMERS OF LOW MOLECULAR WEIGHT STYRENE-MALEIC ANHYDRIDE RESINS AND HETEROCYCLIC COMPOUNDS AND WATER-SOLUBLE SALTS THEREOF
Robert C. Strand, New City, N.Y., and Donald L. Marion, Homewood, and Dennis G. Anderson, Chicago, Ill., assignors to Sinclair Oil Corporation, New York, N.Y.
No Drawing. Filed Jan. 22, 1969, Ser. No. 793,178
Int. Cl. C08f 45/24, 45/52
U.S. Cl. 260—28.5 R        3 Claims

ABSTRACT OF THE DISCLOSURE

Graft polymers of low molecular weight styrene-maleic anhydride resins with heterocyclic compounds such as ε-caprolactam, 2-pyrrolidone or N-methyl - 2 - pyrrolidone, as well as the water-soluble alkali metal or ammonium salts of said graft polymers and aqueous solutions of such salts are disclosed. Such compositions are useful, for example, in floor polish compositions.

---

This invention relates to graft polymers of low molecular weight styrene-maleic anhydride resins with heterocyclic compounds such as ε-caprolactam, 2-pyrrolidone and N-methyl-2-pyrrolidone, as well as the water-soluble alkali metal or ammonium salts of said graft polymers and aqueous solution of such salts. Such compositions are useful, for example, as floor polish resins.

The reaction of styrene-maleic anhydride copolymers with heterocyclic compounds has been described in U.S. Pat. No. 3,136,738 to Hedrick et al. and in "The Preparation and Properties of Grafts of Polycaprolactam on Vinyl Copolymers," C. B. Chapman and L. Valentine, Journal of Polymer Science, vol. XXXIV, pp. 319–335 (1959). The graft polymers are described as soluble in m-cresol. It has now been discovered, however, that low molecular weight graft polymers of styrene-maleic anhydride copolymers with heterocyclic compounds such as ε-caprolactam, 2-pyrrolidone, etc., can be prepared which in alkali metal or ammonium salt form are water-soluble.

The styrene maleic anhydride resin employed in this invention is relatively low in molecular weight, having about 1 to 5, preferably about 1 to 3, moles of styrene per mole of maleic anhydride and a molecular weight of about 400 to 5000, preferably about 1000 to 3000. The copolymer of styrene and maleic anhydride can be prepared by dissolving the styrene and maleic anhydride in a suitable solvent, employing as a polymerization catalyst a free-radical peroxide catalyst, preferably benzoyl peroxide or dicumyl peroxide, at temperatures of about 85 to 230° C. or higher. Suitable solvents include the aromatic hydrocarbon solvents, which can be either the active aromatic solvents, that is, containing an active hydrogen atom, such as cumene, p-cymene, etc., or the non-active aromatics, such as xylene, toluene, etc. The active aromatic solvents are chain-terminating solvents and give lower molecular weight products. Other suitable solvents are the ketones, such as methylethylketone, which are also active solvents. The preferred manner of carrying out the polymerization is by what is known in the art as incremental feed addition. By this method the monomers and catalysts are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization the formation of the copolymers causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the products necessitates a solvent-stripping operation.

The styrene-maleic anhydride copolymers can be esterified e.g. about 50 to 100, preferably about 60 to 75, percent half-esterified with a water-soluble alcohol or capped glycol corresponding to the general formula:

$$R—(O—R')_x—OH$$

wherein R and R' are aliphatic hydrocarbon radicals, preferably saturated, of about 2 to 6 carbon atoms, and $x=0$ to about 10. The total number of carbon atoms in R and a single R' is often less than about 7. Suitable alcohols and glycols for use in esterifying the styrene-maleic anhydride copolymer are, for example, n-propyl alcohol, ethyl alcohol, isopropyl alcohol, t-butyl alcohol, isoamyl alcohol, capped polyethylene glycols, e.g. polyethylene glycol monobutyl ether, and capped polypropylene glycols, etc. The esterified copolymers often have an acid number (determined as milligrams of KOH required to neutralize one gram of partially esterified copolymer) of about 175 to 325, preferably about 180 to 250.

Esters of the styrene-maleic anhydride copolymer useful in the invention can be prepared by reacting the monohydric alcohol with the copolymer under either bulk or solvent conditions. The reaction temperature may vary depending upon whether a solvent is used, the styrene to maleic anhydride ratio in the copolymer, the particular alcohol employed, etc. Generally, esterification reaction temperatures of about 320 to 400° F., often about 340 to 360° F., can be employed. Advantageously, an esterification catallst such as lithium acetate can be employed.

The heterocyclic compounds employed in this invention are the cyclic amides having the general structure

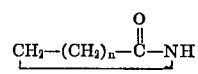

wherein $n$ is 2 to 4 and non-deleterious substituents, e.g. lower alkyl groups, may be substituted on the ring. Suitabe compounds include ε-caprolactam, 2-pyrrolidone and N-methyl-2-pyrrolidone. The amount of cyclic amide employed in the graft polymers of this invention is that sufficient to provide a nitrogen content for said polymer of about 1 to 10 weight percent, preferably about 2 to 5 weight percent, based on the total weight of the graft polymer.

It is thought that the reaction between the styrene-maleic anhydride resin and ε-caprolactam proceeds to form a polyamide structure in addition to a polyimide structure due to the reaction with the styrene-maleic anhydride resin of ε-aminocaproic acid formed by the reaction of ε-caprolactam with water which is present in low concentrations in the reaction components. The reaction of the styrene-maleic anhydride resin with ε-caprolactam could thus produce either or both imide and amide structures as follows:

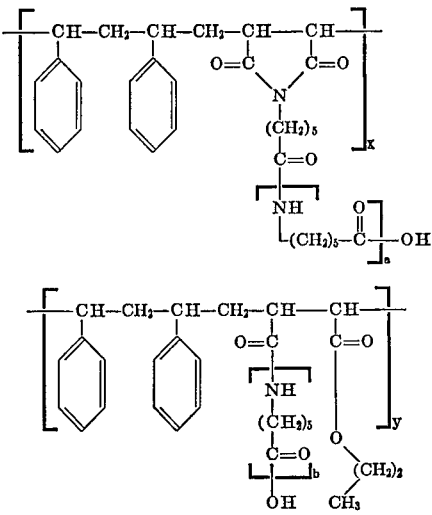

This structure was confirmed for this reaction product by infra red data which indicated the presence of a major imide peak and a minor amide peak. Data for the reactions of the styrene-maleic anhydride resin with 2-pyrrolidone and with N-methyl-2-pyrrolidone are presented in Table I.

TABLE I

| Wave length, μ | 6.05 | 5.87 | 6.1 | 5.75 | 5.85 | 5.61 |
|---|---|---|---|---|---|---|
| Functional group | Amide | Imide | Amine | Ester | Acid | Anhydride |
| Styrene-maleic anhydride resin [1]-2-pyrrolidone adduct | Trace | Major | | | Low | |
| Stryene-maleic anhydride resin [1]-N-merhyl-2-pyrrolidone adduct | Major | | | | Major | Low |

[1] A 70% half-esterified resin having a molar ratio of styrene to maleic anhydride of 2:1, the esterifying alcohol being n-propanol.

Only a trace quantity of the amide formation was shown to be present in the case of the 2-pyrrolidone adduct, while a major amide peak was reported in the case of the N-methyl-2-pyrrolidone adduct. with no imide formation reported for this adduct.

The floor polish compositions which incorporate the graft polymers of this invention as the leveling resin component typically include, in addition, a polymeric film former and a hydrocarbon wax. The graft polymers of this invention are typically employed in such polish and other aqueous compositions in an amount of about 0.5 to 20, preferably about 10 to 20, weight percent of the composition, based on non-volatile materials (NVM). The polymeric film-forming component in the improved composition of the present invention can be any of the emulsifiable, synthetic polymers conventionally employed in aqueous emulsion polish compositions. Such polymers include those obtained by addition polymerization of vinyl monomers, e.g., styrene, methyl styrene, divinylbenzene and other vinyl aromatics, acrylic acids and esters, substituted acrylic acids and esters, vinyl halides, vinyl esters, etc. Examples of suitable film-formers include polystyrene, styrene-acrylic acid copolymers, ethylacrylate-acrylic acid copolymers, ethylacrylate-methacrylic acid copolymers, styrene-methacrylic acid copolymers, etc. Preferably, the film-former will, like the leveling resin, be a carboxyl group-containing polymer such as those composed of polymerized acrylic acid, methacrylic acid, itaconic acid, etc. Advantageously, about 1 to 10% of the monomer units in the film-forming polymer will be carboxyl group-containing monomer units, and often about 2 to 7% will contain carboxyl groups. By the expression "carboxyl groups" as used herein and in the claims is meant unesterified carboxylic acid groups, including carboxylic acid groups which have been neutralized to their salt forms.

Often preferred film-forming polymers are those prepared by addition polymerization of olefinically-unsaturated monomers of 2 or 3 to about 12, preferably about 4 to 8, carbon atoms. And, as stated above, preferably one or more of the monomers will be carboxyl group-containing. Suitable such polymers are disclosed, for example, in U.S. Pat. No. 2,754,280 to Brown et al., herein incorporated by reference.

The polymerization systems most often employed to produce the polymeric film-former used in the composition of the present invention are those systems wherein addition polymerization (including co- or interpolymerization) is effected in the presence of an emulsion polymerization catalyst, emulsifiers and water. These systems have the advantage of preparing an already emulsified polymeric film-former, which emulsion, after treatment, say, to remove or quench unexpired catalyst, may be used directly in formulating the polish composition. Ordinarily, the film-forming polymers have a molecular weight of about 10,000 to 50,000 and are preferably in a finely-divided form, that is, characterized by a particle size in emulsion of about 0.02 to 1 micron, most preferably about 0.04 to 0.6 micron. While the ratios of the various components in the polish compositions may vary widely, polymeric film-former will generally comprise about 50 to 90, often about 60 to 80, percent of the composition, based on non-volatile materials (NVM).

The waxes that may be employed in the polish composition of the present invention are emulsifiable, essentially hydrocarbonaceous waxes. They may be either crystalline or amorphous in structure and may be of mineral, animal or vegetable origin, or, as is often preferred, may be synthetically derived. The particular waxes selected will depend on the physical properties desired in the applied emulsion. The waxes which are normally used include, for example, beeswax, ozokerite, microcrystalline wax, paraffin wax, carnauba wax, etc. Preferred waxes include emulsifiable, waxy, polymeric materials such as polyethylene wax or Fisher-Tropsch waxes. The polyethylene waxes employed generally have a molecular weight of about 3000 to 15,000. Waxy copolymers of ethylene and addition polymerizable, polar group-containing monomers, e.g., vinyl esters and acrylic acid esters, may also be used if desired. Advantageously, the hydrocarbon wax will also be a carboxyl group-containing wax. Carboxylated waxes are well known and are often derived by oxidation of the hydrocarbon wax, for example polyethylene wax, or, in the case of waxes obtained from addition polymerization of olefinic monomers, by inclusion of minor amounts of copolymerizable, olefinically-unsaturated carboxylic acids, such as acrylic acid, methacrylic acid, etc., in the polymerization mixture. Thus, it is often preferred that carboxyl group-containing hydrocarbon waxes having an acid number of at least about 5 be employed. Examples of suitable synthetic waxes and method of preparing same are those disclosed, for example, in U.S. Pat. No. 2,504,400 to Erchak et al. and U.S. Pats. Nos. 2,683,141 and 2,712,534 to Erchak, herein incorporated by reference. Generally, the hydrocarbon wax will comprise about 1 to 20, preferably about 3 to 15, weight percent of the polish composition, based on non-volatile materials.

A novel aspect of the floor polish compositions of this invention is that the polishes exhibit an unusually long drying time. This feature can be utilized to achieve improved flow and leveling characteristics, particularly under high temperature or low humidity conditions, or when the polish is applied over a porous substrate, such as aged and worn tile.

A unique application for the graft polymers of this invention is the use of such polymers as a "one-component" floor polish. In such a floor polish composition the graft polymer of styrene-maleic anhydride with the cyclic amide is employed to fulfill the performance requirements of polymeric film-former, leveling resin and hydrocarbon wax. In addition to ease of formulation, the one-component polishes of this invention may be prepared as water clear solutions, whereas most present day emulsion products have a milky, opaque solution appearance. In these one-component polishes, a major amount of water is employed with a minor amount of the graft polymer of the present invention. Generally a solution containing In preparing the graft polymers, some reactions were conducted employing a fusion or hot melt technique while a common solvent medium was employed in other reactions. The only noticeable difference in the product obtained was an improved resin color where the solvent technique was employed. The reactants generally were heated to temperatures in the range of 140 to 175° C. for a period of five to seven hours. Where the fusion process was employed, the product was isolated by repeated water-washing. Where the common solvent method was employed, the product was separated by precipitation with a non-solvent such as pentane or hexane. Table II lists various graft polymers of this invention with corresponding analytical data.

TABLE II.—SYNTHESIS OF STYRENE MALEIC ANHYDRIDE RESIN ADDUCTS

| | A | B | C | D | E | F | G |
|---|---|---|---|---|---|---|---|
| Styrene-maleic anhydride resin | Resin 1 [1] | Resin 1 | Resin 2 [2] | Resin 3 [3] | Resin 1 | Resin 1 | Resin 1 |
| Resin charged, grams | 100 | 635 | 101 | 100 | 100 | 100 | 100 |
| Coreactant | 2-pyrol [6] | 2-pyrol | 2-pyrol | 2-pyrol | m-Pyrol [7] | N-MeOH,[8] 2-pyrol | v-Pyrol [9] |
| Coreactant charged, grams | 105 | 635 | 101 | 100 | 120 | 60 | 100 |
| Catalyst | HBZ [10] | HBZ | HBZ | HBZ | HBZ | HBZ | HBZ |
| Catalyst grams | 1.0 | 13.0 | 2.0 | 2.0 | 1.0 | 0.80 | 1.0 |
| Accelerator | | | | | | | |
| Accelerator charged, grams | | | | | | | |
| Solvent charged | | | | | | | |
| Solvent charged, gram | | | | | | | |
| Reaction time (hours) | 6.0 | 5.5 | 6.0 | 6.0 | 5.0 | 5.0 | 5.0 |
| Reaction temperature (° C.) | 175 | 175 | 175 | 175 | 175 | 150 | 165 |
| Appearance of unwashed product | Dark viscous liquid | Dark viscous liquid | Dark viscous liquid | Dark viscous liquid | Dark viscous liquid | Dark viscous liquid | Dark viscous liquid |
| Physical properties of washed products: | | | | | | | |
| Acid Number | 123 | 109 | 192 | 169 | 172 | 176 | 130 |
| Percent nitrogen | 2.82 | 3.73 | 3.20 | 1.81 | 2.57 | 4.33 | 2.89 |
| Melting point (cap) | 108–130 | 98–110 | 55–78 | 118–138 | 90–110 | 67–81 | 95–130 |
| Iodine No | 1.2 | 4.9 | 4.0 | 3.6 | 0.6 | 2.4 | 19.5 |
| Solution color (15% NVR) | 7 | 5 | 7 | 7 | 7 | 5 | 9–10 |
| Scrubability using 1.5% Spic and Span: | | | | | | | |
| Film appearance | Cracked | Cracked | Cracked | Cracked | Cracked | Exc. gloss | Cracked |
| Blush | 100 | 100 | 25 | 70 | 100 | 10 | 50 |
| 25% removal | 400 | 400 | 40 | 400 | 400 | 10 | 20 |
| 50% removal | 500 | 500 | 50 | 500 | 500 | 15 | 30 |
| 100% removal | +500 | +500 | 70 | +500 | +500 | 20 | 60 |

| | H | I | J | K | L | M |
|---|---|---|---|---|---|---|
| Styrene-maleic anhydride resin | Resin 1 | Resin 1 | Resin 1 | Resin 4 [4] | Resin 5 [5] | Resin 5 |
| Resin charged, grams | 300 | 300 | 100 | 200 | 200 | 300 |
| Coreactant | Caprolactam | Caprolactam | Caprolactam | Caprolactam | Caprolactam | Caprolactam |
| Coreactant charged, grams | 63 | 300 | 100 | 72 | 85 | 255 |
| Catalyst | Catalyst | HBZ | NaH | HBZ | HBZ | HBZ |
| Catalyst charged, grams | 2.0 | 12.0 | 0.20 | 1.3 | 1.5 | 2.0 |
| Accelerator | | Water | N-acetyl caprolactam | | | |
| Accelerator charged, grams | | 30.0 | 0.23 | | | |
| Solvent charged | | | MIAK [11] | | | |
| Solvent charged, grams | | | 150 | | | |
| Reaction time (hours) | 3.0 | 5.0 | 6.0 | 3.0 | 2.5 | 3.0 |
| Reaction temp. (° C.) | 160 | 450 | 150 | 180 | 150 | 150 |
| Appearance of unwashed product | Viscous liquid | Dark liquid | Dark liquid | Dk. viscous liquid | Dark solid | Dark solid |
| Physical properties of washed products: | | | | | | |
| Acid Number (TBC) | 174 | | 140 | 233 | 283 | 172 |
| % Nitrogen | 2.15 | | 2.75 | 2.52 | 3.02 | 6.7 |
| Melting Point (cap) | 91–115 | | 77–118 | 103–126 | 75–98 | 25–34 |
| Iodine No | 3.7 | | 7.2 | 3.6 | 0.5 | 1.8 |
| Solution Color (15% NVR) | 1–2 | 4 | 7 | 5 | 6 | 6 |
| Scrubability using 1.5% Spic and Span: | | | | | | |
| Film Appearance | Cracked | Cracked | Very slight crack | Crack | Exc. gloss | |
| Blush | 50 | 10 | 10 | 5–10 | 50 | |
| 25% Removal | 20 | 20 | 100 | 10 | 10 | |
| 50% Removal | 30 | 40 | +200 | 15 | 15 | |
| 100% Removal | 60 | 50 | +200 | 20 | 20 | |

[1] Molar ratio of styrene to maleic anhydride=2:1; 70 percent half-esterified with n-propanol.
[2] Molar ratio of styrene to maleic anhydride=1:1; molecular weight=1600.
[3] Molar ratio of styrene to maleic anhydride=3:1; molecular weight=1900.
[4] Molar ratio of styrene to maleic anhydride=3:1; molecular weight=1700.
[5] Molar ratio of styrene to maleic anhydride=1:1; molecular weight=600–700.
[6] 2-Pyrrolidone.
[7] N-methyl-2-pyrrolidone.
[8] N-methylol-2-pyrrolidone.
[9] N-vinyl-2-pyrrolidone.
[10] Benzoic acid.
[11] Methyl isoamyl ketone.

about 0.5 to 25, preferably about 12 to 20, weight percent graft polymer provides a workable system.

The following example is illustrative of the compositions of this invention:

The styrene-maleic anhydride resin, the cyclic amide compound and the catalyst were charged to a flask fitted with a stirrer, thermometer, condenser and nitrogen inlet.

Resin-adduct H from Table II in the amount of 30 grams was solubilized in 100 grams water using ammonium hydroxide to aid in dissolving the polymer. The resulting solution comprised 16.1 weight percent resin solids with pH=9.2. This solution was applied at the rate of 526 ft.$^2$/gal. to a tile floor to produce a high gloss coating.

A solution of 16 grams resin-adduct M in 85 grams water and 1.5 ml. 28 percent solution of ammonium hydroxide was prepared. The solution comprised 15.3 weight percent solids with pH=9.0. The solution produced a high gloss coating when applied to a tile floor at the rate of 525 ft.²/gal.

Table III illustrates the results obtained from employing the resin-adducts of Table II in floor polish compositions. The polishes were applied at 526 ft.²/gal. spreading rate and scrubbed with 1.5% Spic and Span solution using the Gardner Washability Machine. The polish compositions employed in Table III have the following formulations.

Polish No. 1:                                                                  Volume percent
   RWL–100–LC, a commercial polystyrene emulsion, 15 percent solids by weight _____ 65.0
   Leveling resin, 15 percent solids by weight, NH₄ soln. in water _____ 12.5
   U–3050, a commercial acrylate ester emulsion, 15 percent solids by weight _____ 12.5
   AC–680, a commercial polyethylene wax emulsion, 15 percent solids by weight ____ 10.0
   KP–140, a commercial tri-butoxyethyl phosphate _____ 1.0
   2-pyrrolidone _____ 0.4

Polish No. 2:
   Rhoplex B–231, a commercial polyacrylate emulsion, 15 percent solids by weight __ 65.0
   Leveling resin, 15 percent solids by weight, NH₄ soln. in water _____ 25.0
   AC–680 _____ 10.0
   KP–140 _____ 1.2
   2-pyrrolidone _____ 0.5

Polish No. 3:
   NH–401–DL, a commercial polyacrylate emulsion, 15 percent solids by weight ____ 65.0
   Leveling resin, 15 percent solids by weight, NH₄ soln. in water _____ 25.0
   AC–680 _____ 10.0
   KP–140 _____ 1.2
   2-pyrrolidone _____ 0.5
   Ethylene glycol _____ 2.0

Polish No. 4:
   Rhoplex B–336, a commercial polyacrylate emulsion, 15 percent solids by weight __ 72.5
   Leveling resin, 15 percent soldis by weight, NH₄ soln. in water _____ 16.5
   AC–680 _____ 11.5
   Carbitol, a commercial diethylene glycol monoethyl ether _____ 1.5
   Ethylene glycol _____ 1.5
   KP–140 _____ 0.35
   FC–128 (1% soln.), a commercial fluorochemical surfactant _____ 0.4

TABLE III.—PERFORMANCE OF RESIN ADDUCTS IN FLOOR POLISH COMPOSITIONS

| Leveling resin | Resin-adduct "A"[1] | Resin-adduct "E"[2] | Resin 1[3] |
|---|---|---|---|
| Polish No. 1: | | | |
| Film appearance | Excellent | Excellent | Excellent |
| Strokes to blush | 10 | 10 | 10 |
| 50% removal | +400 | 300 | 50 |
| 100% removal | +400 | +400 | 100 |
| Polish No. 2: | | | |
| Film appearance | Excellent | Excellent | Excellent |
| Strokes to blush | 60 | 60 | 10 |
| 50% removal | 100 | 80 | 20 |
| 100% removal | +300 | 100 | 30 |
| Polish No. 3: | | | |
| Film appeanace | Excellent | Excellent | Excellent |
| Strokes to blush | 200 | 100 | 30 |
| 50% removal | +500 | +500 | 100 |
| 100% removal | +500 | +500 | 200 |
| Polish No. 4: | | | |
| Film appeaance | Excellent | Excellent | Excellent |
| Strokes to blush | 100 | 100 | 30 |
| 50% removal | +500 | +500 | 300 |
| 100% removal | +500 | +500 | +500 |

[1] See resin-adduct "A" in Table I.
[2] See resin-adduct "E" in Table I.
[3] See footnote (1) bottom of Table I.

Several styrene-maleic anhydride resin adducts of this invention were evaluated as one-component polish vehicles. Films applied from ammoniacal solution exhibited a high degree of detergent resistance, adhesion and abrasion resistance. Such performances were obtained even though the films were cracked, a condition which generally promotes premature film degradation. Use of plasticizers in low concentrations enhanced film formation while maintaining the previously mentioned performance characteristics. Table IV illustrates the performance of these one-component polish vehicles.

TABLE IV.—ONE-COMPONENT POLISHES

| | Polish No. 1 | Polish No. 2 | Polish No. 3 |
|---|---|---|---|
| Styrene-maleic anhydride resin adduct | Resin 1[1] | Resin 1 with 2-pyrrolidone | Resin 1 with 2-pyrrolidone |
| Plasticizer[2] | 0.15% KP–140, 0.20% carbitol | | 0.15% KP–140, 0.20% carbitol |
| Film appearance 526 ft.²/gal. | Continuous; slight cratering | Cracked | Continuous; slight cratering |
| 1,500–2,000 ft.²/gal. | Continuous | Cracked | Continuous |
| Blush resistance[3] | 15 | 200 | 250 |
| Strokes for 25% film removal[4] | 90 | 400 | +500 |

[1] See footnote (1) bottom of Table II.
[2] Weight percent based on weight of the resin solution.
[3] Number of strokes required for appearance.
[4] Films applied at 526 ft.²/gal. spreading rate and scrubbed with 1.5% Spic and Span solution using Gardner Washability Machine.

It is claimed:

1. A detergent resistant aqueous emulsion polish composition comprising a polymeric film-former, a carboxyl group-containing leveling resin and a hydrocarbon wax, the improvement comprising the employment as the carboxyl group-containing leveling resin of a water soluble, ammonium or alkali metal salt of a graft polymer of a styrene-maleic anhydride copolymer having about a 1:1 to 5:1 molar ratio of styrene to maleic anhydride and a molecular weight of about 400 to 5,000, with a heterocyclic compound having the structure:

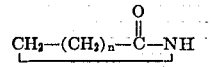

wherein $n$ is 2 to 4, in which the amount of heterocyclic compound in said graft polymer is that sufficient to provide a nitrogen content for said polymer of about 1 to 10 weight percent, based on the total weight of the graft polymer and wherein the acid number for said graft copolymer varies between 109 and 283.

2. The polish of claim 1 in which the styrene-maleic anhydride copolymer is about 60 to 75 percent half-esterified with a water-soluble alcohol or capped glycol corresponding to the general formula

wherein R and R' are aliphatic hydrocarbon radicals of about 2 to 6 carbon atoms, the total number of carbon atoms in R and a single R' is less than about 7, and $x$ is 0 to about 10.

3. The polish of claim 1 in which the heterocyclic compound is selected from the group consisting of ε-caprolactam, 2-pyrrolidone and N-methyl-2-pyrrolidone.

References Cited

UNITED STATES PATENTS

| 2,586,477 | 2/1952 | Niles | 260—78.5 T |
| 2,607,762 | 8/1952 | Bowen | 260—78.5 T |
| 2,757,715 | 7/1956 | Bowen | 260—78.5 T |
| 3,136,738 | 6/1964 | Hedrick | 260—857 G |
| 3,234,158 | 2/1966 | Pfluger | 260—28.5 |
| 3,313,755 | 4/1967 | O'Rourke | 260—28.5 |

ALLAN LIEBERMAN, Primary Examiner

S. L. FOX, Assistant Examiner

U.S. Cl. X.R.

260—28.5 A, 28.5 D, 29.6 HN